United States Patent [19]

Ng et al.

[11] Patent Number: 5,708,817
[45] Date of Patent: Jan. 13, 1998

[54] PROGRAMMABLE DELAY OF AN INTERRUPT

[75] Inventors: Chi-Shing J. Ng, San Jose; Magnus Karlsson, Milpitas, both of Calif.

[73] Assignee: Apple Computer, Inc., Cupertino, Calif.

[21] Appl. No.: 456,114

[22] Filed: May 31, 1995

[51] Int. Cl.$^6$ ................................................ G06F 13/00
[52] U.S. Cl. ........................................ 395/739; 395/733
[58] Field of Search ........................ 395/740, 737, 395/550, 739, 733, 559, 552

[56] References Cited

U.S. PATENT DOCUMENTS

| | | | |
|---|---|---|---|
| 3,789,365 | 1/1974 | Jen et al. | 395/737 |
| 5,060,239 | 10/1991 | Briscoe et al. | 375/38 |
| 5,247,654 | 9/1993 | Hamid et al. | 395/550 |
| 5,363,506 | 11/1994 | Fukuoka | 395/740 |
| 5,423,049 | 6/1995 | Kurihara | 395/735 |

*Primary Examiner*—Jack B. Harvey
*Assistant Examiner*—Xuong Chung-Trans
*Attorney, Agent, or Firm*—Carr & Ferrell, LLP

[57] ABSTRACT

A programmable interrupt delay in a communication circuit enables accurate timing of an interrupt delay without tying up processor CPU cycles in the execution of a delay loop. The interrupt delay comprises a memory containing the program delay value. A communication circuit which generates an interrupt output corresponding to the transmission of a communication data stream is coupled to a timing circuit having a time value. This timing circuit also has a timing start input, which triggers timing of the timing value upon receipt of the interrupt output. A comparator coupled to the memory and to the timing circuit compares the time value to the delay value and generates a delayed interrupt when the time value and the delay value are equal.

17 Claims, 9 Drawing Sheets

PROGRAMMABLE DELAY OF AN INTERRUPT

BACKGROUND OF THE INVENTION

1. Field of the Invention

The present invention relates generally to the field of computers and more specifically to the generation of interrupts in a multiprocessor computer network.

2. Description of the Background Art

Referring now to FIG. 1(a) a schematic diagram is shown of a prior art printer 120 coupled to a network bus 160. Printer 120 is processor-based and conventionally constructed using a von Neuman architecture. A Central Processing Unit (CPU) 125 is coupled to a variety of peripheral components through a data bus 145. CPU 125 receives stored instructions from Read-Only Memory (ROM) 130 and receives and stores data to Random Access Memory (RAM) 150. Data is communicated from CPU 125 to a printer engine 135 through a printer driver 140. Communication with the network bus 160 occurs through a Serial Communications Controller SCC 155. Conventional communication with the SCC 155 originates with the CPU 125 receiving data from or transmitting data to the network bus 160, through the SCC 155. Equivalently, communication with the network bus 160 via the SCC 155 can originate in the printer RAM 150 and be facilitated using convention Direct Memory Access (DMA) logic (not shown). In the case of data transmission, CPU 125 first transmits data to the SCC 155, which then relays the data to the network bus 160. Once data transmission is completed between the CPU 125 and the SCC 155, the SCC 155 generates an interrupt signal notifying the CPU 125 that data transmission has been completed.

Referring also now to FIG. 1(b) a pictorial diagram is shown of a prior art byte sequence used by the printer 120 in communicating with the network bus 160. FIG. 1(b) illustrates the byte sequence used in transmitting data from the CPU 125 to the network bus 160. The sequence comprises a series of bytes 165 beginning with a two byte sequence of opening flags 170 followed by a variable sequence of data bytes 175. Following the transmission of the last data byte 175, the SCC 155 generates a pair of CRC bytes 180 and a closing flag 185. A sequence of abort bits 190 comprising 12 bits of 1's follows the closing flag 185 in the transmit sequence. It is important that the CPU 125 be notified as soon as the SCC 155 transmission is completed in order that the CPU 125 can enable the SCC 155 to receive other communications from the network bus 160. The problem of the prior art transmission sequence is that CPU 125 generates a sequence of data bytes 175 and the SCC 155 is responsible for generating an interrupt signal 197 notifying the CPU 125 that data transmission has been complete. However, as can be seen from FIG. 1(b), the interrupt signal 197 is generated at the interrupt reference 195 in FIG. 1(b) following receipt by the SCC 155 of the last data byte 175 from the CPU 125. The SCC 155 must still generate the CRC bytes 180, the closing flag 185 and the abort bits 190. Therefore, a delay is required of approximately four-and-a-half bytes, which is equal to the period beginning with the receipt of the last data byte 175 and ending with the transmission of the last abort bit 190 by the SCC 155. The conventional method for generating this interrupt delay is for the CPU 125 to enter into a tight wait loop or timing delay initiated by the receipt of the interrupt signal 197. The CPU 125 cycles through a tightly controlled wait sequence for the period approximately equal to four-and-a-half bytes. This wait loop, however, is extremely expensive from the viewpoint of CPU 125 cycles, since bit transmission speed is extremely slow relative to a CPU clock cycle. Furthermore, the CPU 125 must ignore all other interrupts during this timing delay, otherwise calculation of the interrupt delay period will be corrupted. Therefore, while the final four-and-a-half control bytes are being transmitted from the SCC 155 to the network bus 160, a significant amount of idle time is wasted by the CPU 125. Additionally, disability of all interrupts during this timing loop may present real-time response issues for certain devices.

Referring now to FIG. 1(c), a flow diagram is shown illustrating the prior art timing loop used to delay the interrupt processing of data communication with the network bus 160.

In step 101, the CPU 125 receives the interrupt signal 197 from SCC 155. The CPU 125 then disables 103, all other interrupt processing and enters a timing delay sequence. The CPU 125 initializes a timer register with some preset number of counts equivalent to the delay required to transmit the four-and-a-half bytes from the SCC 155 to the network bus 160. In step 110, the timer register is decremented and the time-out is tested in step 115. If the timer register is equal to zero, the sufficient delay period has been achieved and the process stops. If the timer register is a positive value, the process loops back to step 110 and the timer register is again decremented and the process iterates until the time-out register holds a zero value. In step 110, the timer is decremented and in step 115, the timer is checked by comparing the timer to either zero or a negative number. If the time-out has not occurred, the process loops back to 110 with further decrementing of the timer until time-out has occurred and the process stopped.

What is needed is a method and circuit which can receive the interrupt signal from the SCC 155 and generate the necessary delay period independent of the processing steps of the CPU 125. This separate delay programming will enable the CPU 125 to continue processing other data while the SCC 155 interrupt time-out is separately handled.

SUMMARY OF THE INVENTION

In accordance with the present invention, a method and circuit are described for receiving an interrupt signal from an SCC and for generating a programmable interrupt delay. This separate delay programming enables the CPU to continue processing other data while the SCC interrupt delay is separately handled. In the preferred embodiment, a printer engine is preferably coupled to a CPU and various peripheral components through a databus. The CPU receives print information from a separate network databus. The print information is transferred to the CPU, across the databus, from the network bus and then to the engine for printing; communication with the network bus is through a Serial Communication Controller (SCC). When the SCC is in a data transmit mode, that is when data is being transferred from RAM to the network bus, DMA logic transfers data from RAM to the SCC. The SCC begins the transmission to the network bus by generating a pair of opening flags. Following the opening flags, the SCC then transmits the data bytes from RAM, followed by CRC bytes, a closing flag, and a sequence of abort bits. The SCC generates an interrupt upon receiving the last data byte from the RAM, and transmits this interrupt to an interrupt controller. This interrupt controller initiates a timing sequence in which a counter register is compared to a preprogrammed delay period. When the counter register value equals the preprogrammed delay value, a delay interrupt is generated and this delay interrupt is then transmitted to the CPU, indicating that the transmitted data bytes have been properly sent to the network bus. The interrupt controller, therefore, enables the insertion of delay in the interrupt from the SCC to the CPU which is required in order that the SCC has time to transmit the CRC bytes, the closing flag, and the abort bits, prior to interrupt notification of the CPU that transmission has been completed.

A similar delay interrupt is generated when the SCC is operating in a data receive mode, in which data is transmitted from the network to the CPU. In the data receive mode, the interrupt is generated by the SCC following the receipt of the closing flag. Once the closing flag is received from the network bus by the SCC, the SCC generates an interrupt signal which is then transferred to the interrupt controller. The interrupt controller then initiates a counter having a value which is compared to a preprogrammed delay value. When the preprogrammed delay value is equal to the counter value, a delayed interrupt is generated and transferred to the CPU. Prior to transmission or receipt of data by the SCC, the CPU programs the interrupt controller via the data bus with an appropriate delay value. The programmed delay value is equal to the transmission time required for four-and-a-half data bytes when the SCC is operating in the transmit mode, and for one-and-a-half data bytes when the SCC is in the receive mode.

DETAILED DESCRIPTION OF THE PREFERRED EMBODIMENTS

Figure 2:
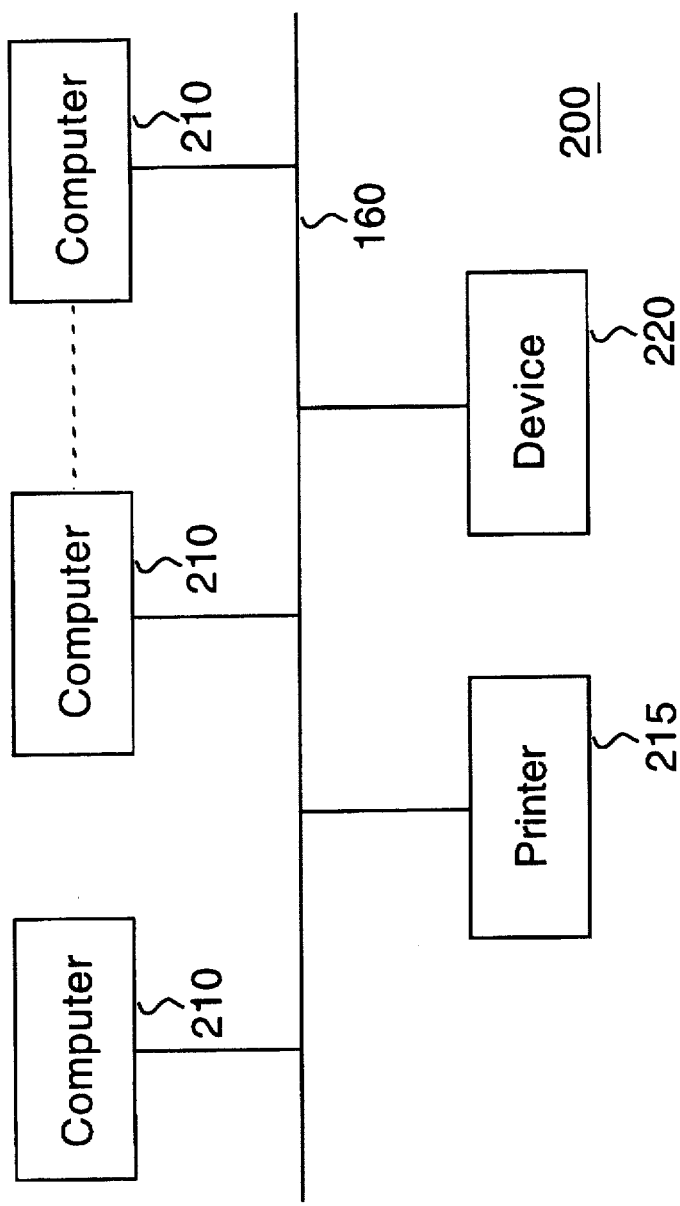
FIG. 2 is an overview block diagram illustrating the connection of computers and the printer of the preferred embodiment to a network bus.

Referring now to FIG. 2, an overview block diagram is shown illustrating the connection of computers 210 and the preferred printer 215 of the present invention. A network 200 consists of one or more computers 210 coupled to printers 215 and other devices 220 through a network bus 160. In the preferred embodiment, the computers 210 are general purpose, microprocessor-based personal computers such as the Apple Macintosh manufactured by Apple Computer of Cupertino, Calif. The network bus 160 is preferably a LocalTalk network which supports the AppleTalk networking protocol. It will, however, be obvious to one skilled in the art, that the interrupt delay circuitry of the present invention is also useful for a wide range of computer applications in which interrupts are required to be delayed. The computers 210 preferably transmit and receive information to each other and to other peripherals such as printer 215 and devices 220 along the network bus 160.

Figure 3:
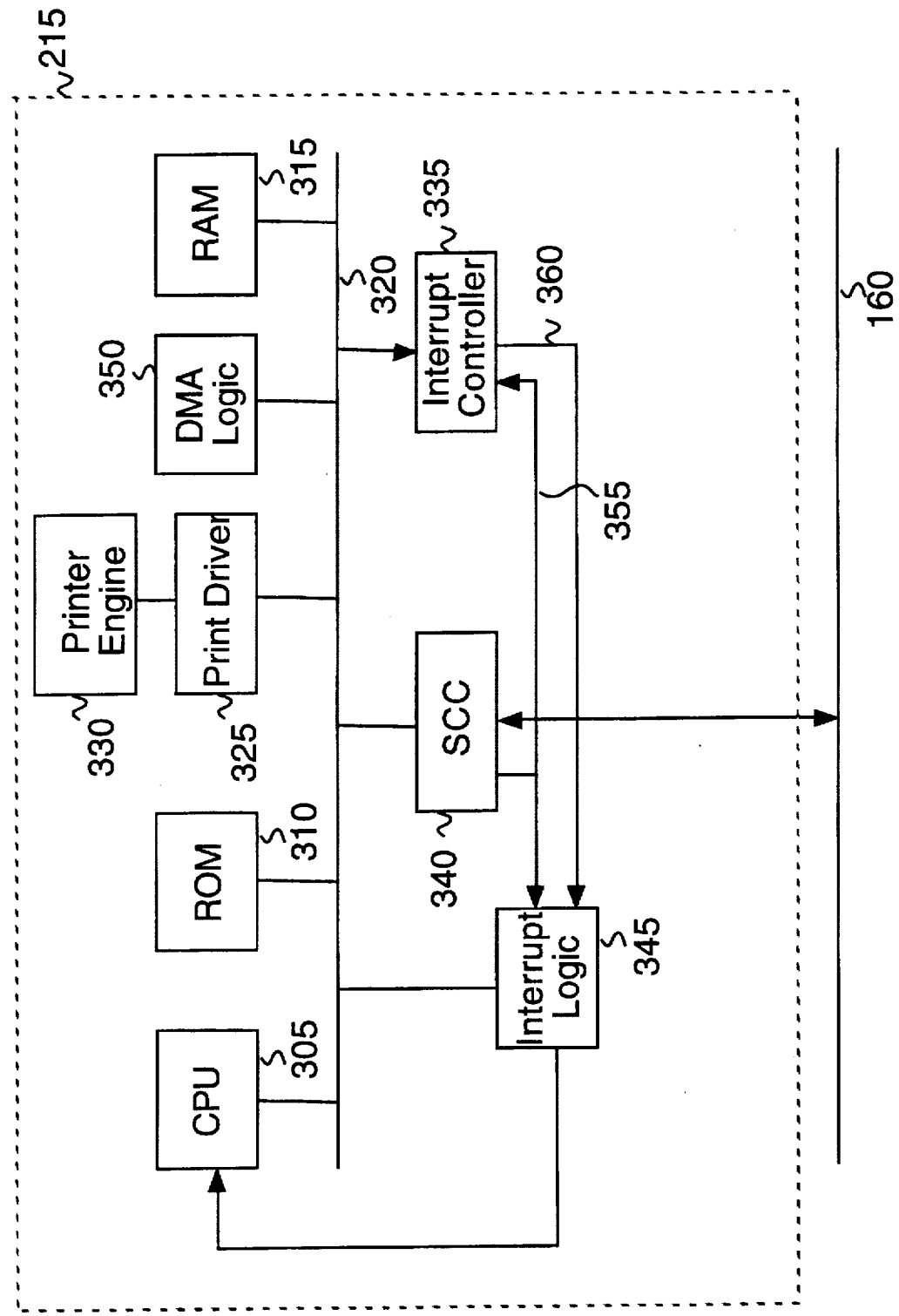
FIG. 3 shows a schematic architecture of the printer of the preferred embodiment connected to the network data base of FIG. 2.

Referring now to FIG. 3, a detailed block diagram is shown of the printer 215 connected to the network bus 160. Printer 215 is preferably a laser printer comprising a Central Processing Unit (CPU) 305 coupled to a printer engine 330 through a data bus 320. Various peripheral components are coupled to the CPU 305 through data bus 320 and support the operation of the CPU 305. The CPU 305 receives processing instructions from ROM 310 and reads and writes information to RAM 315. The CPU 305 receives print information from one of the computers 210 via the network bus 160. After processing, the print data is transferred by the CPU 305 across the data bus 320 and to the print engine 330 through a print driver 325. Communication with the network bus 160 is through a Serial Communication Controller (SCC) 340. The purpose of the SCC 340 is to transmit and receive data packets onto and from the network bus 160. Conventional Direct Memory Access logic (DMA) 350 preferably controls the transfer of data between RAM 315 and the SCC 340. Alternatively, the CPU 305 can transmit data to and from the SCC 340 directly. The SCC 340 supports the communication protocol of the network bus 160 by providing the required necessary opening and closing communication flags, the Cyclical Redundancy Check (CRC) and transmission abort bits. In the preferred embodiment, the SCC is implemented using a Zilog 8530 programmable serial communication controller.

In the preferred embodiment, the interrupt controller 335 receives an interrupt signal from SCC 340 and delays this interrupt by an amount programmed by CPU 305 via the data bus 320. The delayed interrupt signal 360 is then transmitted to the CPU 305 through interrupt logic 345. This delayed interrupt signal 360 notifies the CPU 305 that the transmission of the data signal onto the network bus 160 has been completed.

Interrupt logic 345 is a multiplexer which selects interrupt signals (355, 360) from among various inputs and forwards the selected signals to the CPU 305. Control of the interrupt logic 345 is from the CPU 305 via data bus 320. The interrupt logic 345 enables the CPU 305 to select the interrupt signal 355 directly from the SCC 340, or the delayed interrupt signal 360 from the interrupt controller 335.

Figure 4:
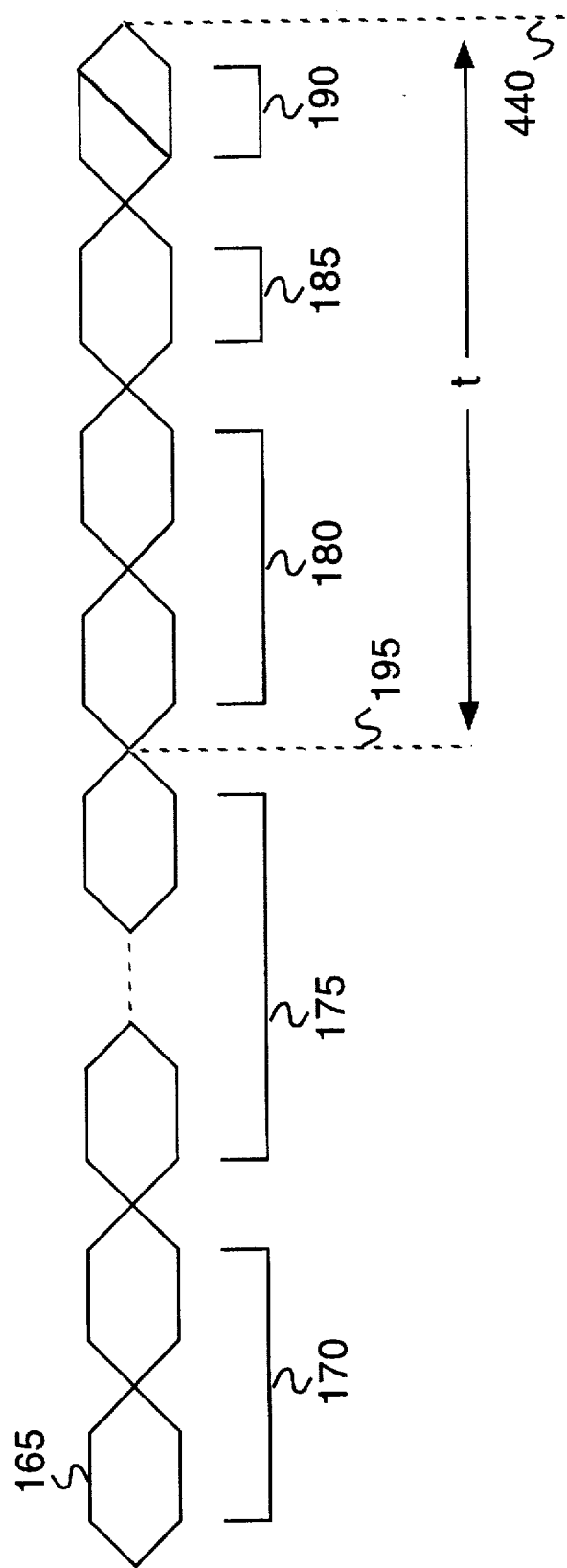
FIG. 4 is a pictorial diagram illustrating the byte sequence of the transmit signal generated by the printer of FIG. 3.

Referring also now to FIG. 4, the frame diagram of the LocalTalk protocol is shown, indicating an interrupt reference 195 at which point in the data sequence the SCC 340 generates an interrupt signal 355. The LocalTalk protocol comprises a pair of bytes representing opening flags 170, followed by a number of data bytes 175, a pair of CRC 180 bytes, and a byte representing the closing flag 185. The frame is concluded by 12 abort bits 190 which are appended to the end of the closing flag. When the CPU 305 prepares to transmit data to the network data bus 160, the data is transferred from RAM 315 to the SCC 340 using the DMA logic 350. The SCC 340 then generates the opening flags 170 and proceeds to transmit the data bytes 175 onto the network bus 160. Once receipt of the data bytes 175 from the RAM 315 by the SCC 340 is completed, the SCC 340 generates an interrupt signal 355 which notifies the CPU 305 that the data bytes 175 have been transmitted on network bus 160. However, since the LocalTalk protocol requires CRC bytes 180, a closing flag 185 and abort bits 190, it is necessary that this interrupt signal be delayed until reference 440 through interrupt controller 335 prior to signaling the CPU 305 that transmission has been completed.

In order to generate the delayed interrupt signal 360, CPU 305 programs the interrupt controller 335 through data bus 320 with an interrupt delay period, t. The interrupt delay period t must be sufficient in length to delay the generation of the interrupt from the last data byte 175 transmission (at interrupt reference 195) to the end of the last abort bit 190 (at reference 440). In the case of the LocalTalk protocol, this period is equal to the transmission time required for four-and-a-half bytes. These four-and-a-half bytes are equal to the sum of the two CRC 180 bytes, the closing flag 185 byte, and the one-and-a-half bytes required for the abort bits 190. Once the interrupt controller 335 has been programmed by the CPU 305, the interrupt controller 335 receives the interrupt signal 355 and delays the generation of a delayed interrupt signal 360 by the interrupt delay period t.

Figure 5:
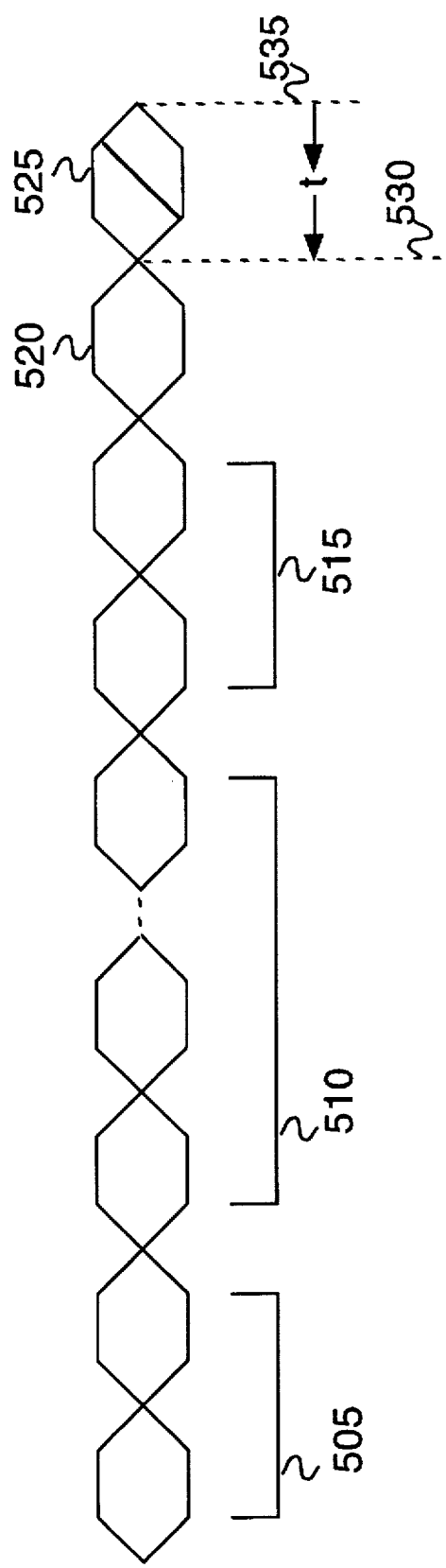
FIG. 5 is a pictorial diagram showing the byte sequence of a signal received by the printer of FIG. 3.

Referring also now to FIG. 5, a frame diagram is shown of the LocalTalk protocol, with the SCC 340 operating in a receive mode. The frame data of the LocalTalk protocol is identified in FIGS. 4 and 5, however, the SCC 340 produces interrupt signals 355 at different points in the frame sequence depending on whether the SCC is operating in the transmit mode or in the receive mode. As in the transmit mode of FIG. 4, the receive mode of FIG. 5 comprises a pair of opening flags 505, a sequence of data bytes 510, a pair of CRC bytes 515, a closing flag 520 and 12 abort bits 525. The distinction between the SCC 340 transmit mode and the receive mode, of FIG. 5, is that the SCC generates an interrupt signal 355 after the closing flag 520 at reference 530 in the receive protocol. In the receive protocol, data or control information is transmitted from the network bus 160 to the RAM 315. The receive protocol initiates with the receipt of an opening flag 505 by the SCC 340 from the network bus 160. Following receipt of the opening flag 505, a number of data bytes 510 are received, followed by a pair of CRC bytes 515 and a closing flag 520. When the SCC 340 receives the closing flag 520 from the network bus 160, the SCC generates an interrupt signal 355 which is then transmitted to the interrupt controller 335 for processing. The interrupt controller 335 generates a delay signal of only one-and-a-half bytes. Following the delay period of t' the interrupt controller 335 transmits a delayed interrupt signal 360 to the interrupt logic 345 for transmission to the CPU 305.

The CPU 305 programs the interrupt controller with the appropriate delay period. When the SCC 340 is operating in the transmit mode, the interrupt signal 355 is received by the interrupt controller 335 and delayed by a period equal to four-and-a-half bytes as programmed by the CPU 305. The appropriate four-and-a-half byte delay is added to the interrupt signal 355 and transmitted to the CPU 305 via interrupt logic 345 as a delayed interrupt signal 360. When the interrupt signal 355 is generated with the SCC 340 in the receive mode, only a one-and-a-half byte delay (having a delay period of t') is required. The interrupt controller 335 then receives the interrupt signal 355 and delays it by a one-and-a-half byte period, as programmed by CPU 305 to interrupt controller 335 through the data bus 320. The interrupt controller 335 then receives the interrupt delay signal 355, delays the interrupt signal 355 by an amount equal to one-and-a-half bytes and transmits this delayed interrupt signal 360 to the CPU 305 via interrupt logic 345.

Figure 6:
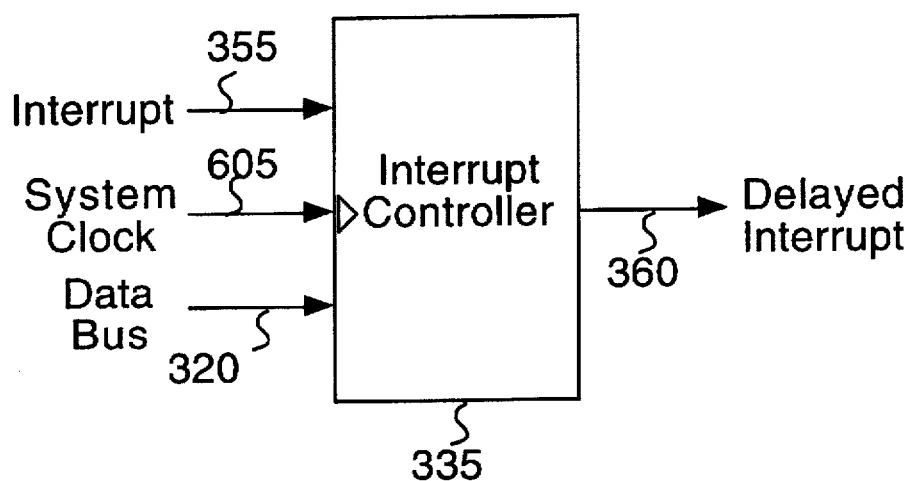
FIG. 6 is a block diagram showing the interrupt controller of the present invention.

Referring now to FIG. 6, a block diagram of the interrupt controller 335 is shown. The interrupt controller 335 receives an interrupt signal 355 and delays the interrupt signal 355 by an amount programmed by CPU 305. This delayed interrupt signal 360 is produced as an output by interrupt controller 335. CPU 305 programs the interrupt controller 335 with a delay value through data bus 320. A system clock is utilized by the interrupt controller 335 to convert the load value into an absolute delay period.

Figure 7:
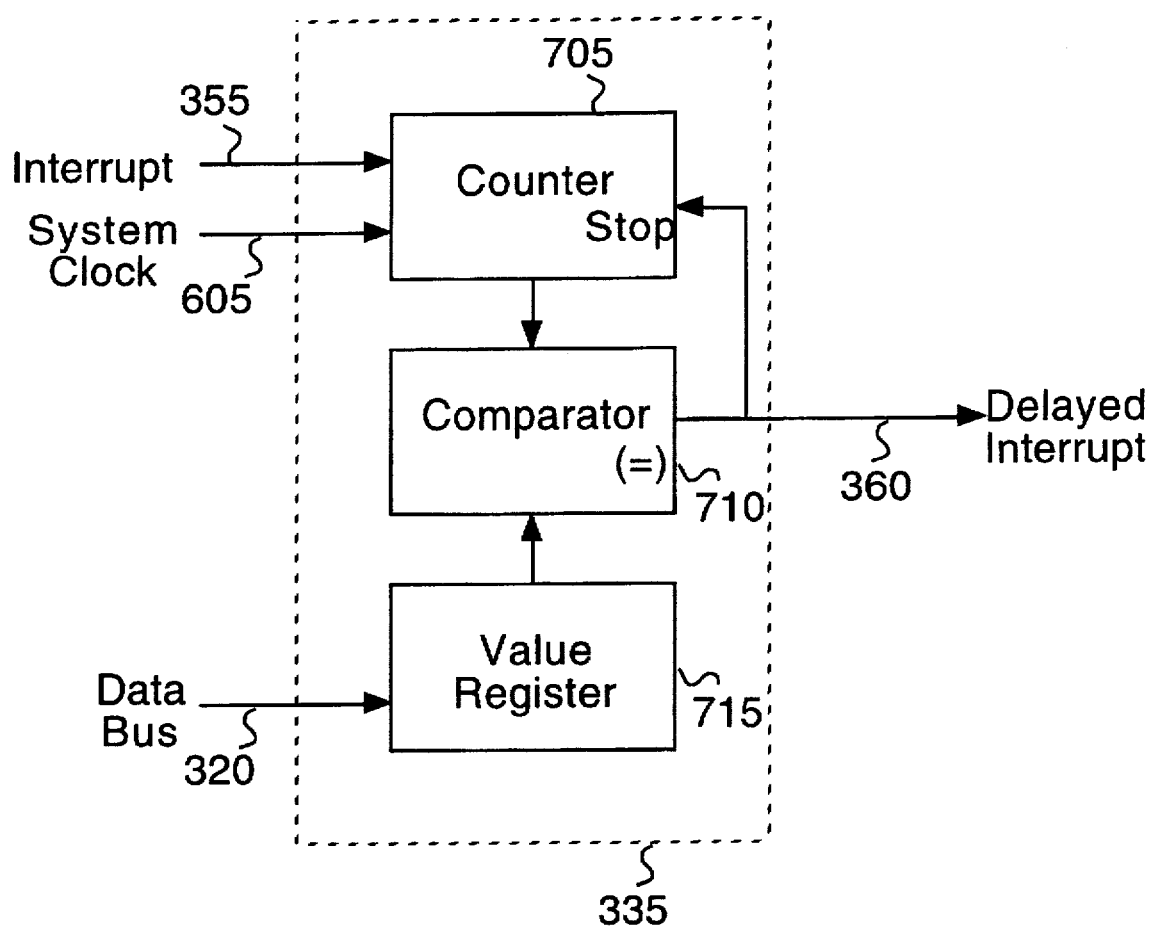
FIG. 7 shows a detailed block diagram of the interrupt controller illustrated in FIG. 6.

Referring now to FIG. 7, a more detailed block diagram of the interrupt controller 335 of FIG. 6 is shown. Interrupt controller 335 has three main components, a counter 705, a comparator 710 and a value register 715. The counter 705 receives the interrupt signal 355 and the system clock 605 as inputs. Upon receipt of the interrupt signal from the SCC 340, the counter resets to zero and begins to increment with each cycle of system clock 605. The contents of the counter 705 are read by the comparator 710 and compared to the contents of the value register 715. The value register 715 contains a delay period (t or t') loaded by CPU 305 corresponding to either the transmit mode or the receive mode of the SCC 340. The transmit mode of the SCC 340 requires a delay period (t) equivalent to four-and-a-half bytes. The receive mode of the SCC 340 requires a delay period (t') of one-and-a-half bytes. One of these values is loaded into the value register 715 by the CPU 305. When the counter 705 is equal to the value in the value register 715, the comparator 710 generates a delayed interrupt signal 360 which is fed back to the counter 705 resulting in the stoppage of counting.

Figure 1A:
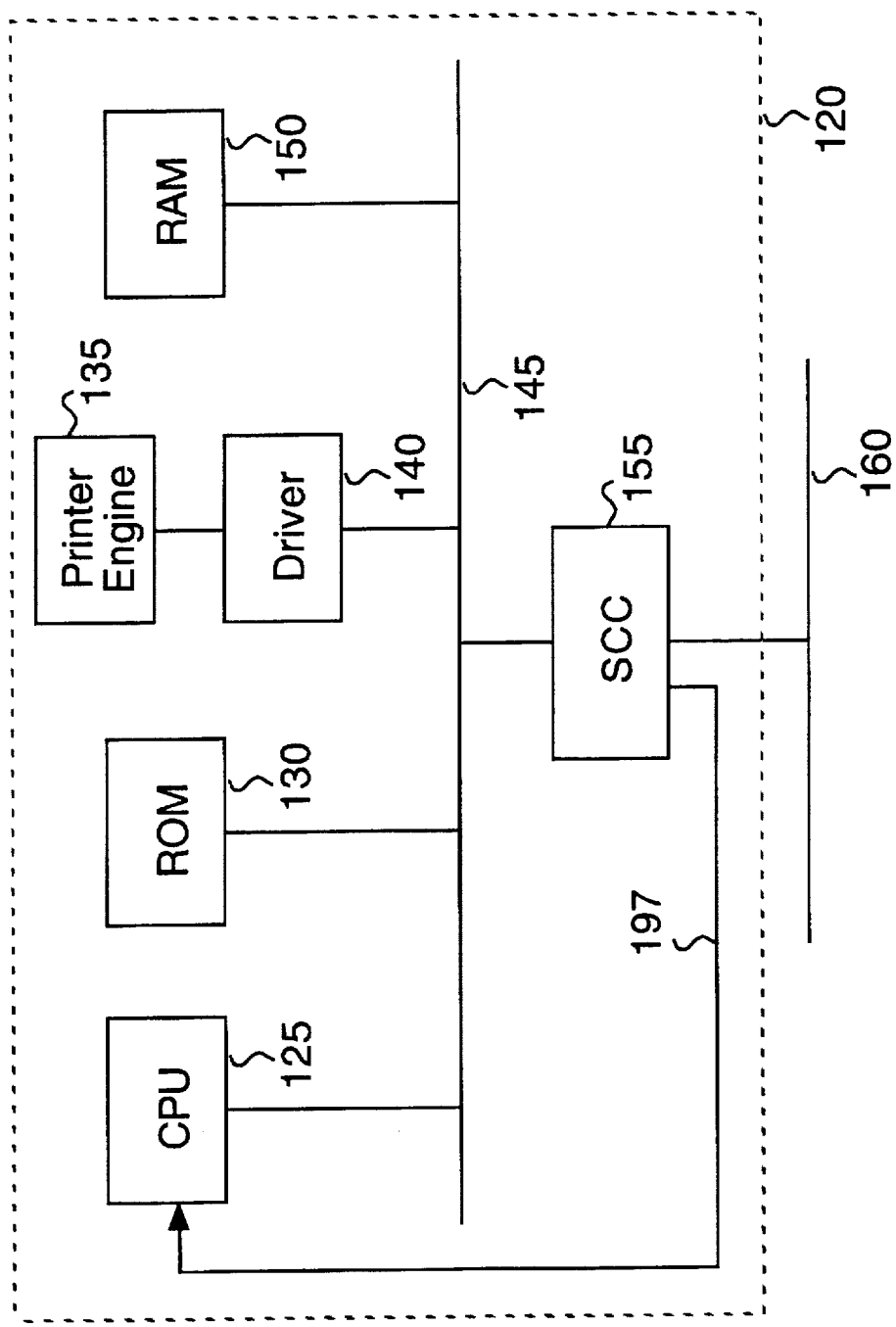
FIG. 1(a) shows a schematic diagram detailing the architecture of a prior art printer coupled to a network bus.
Figure 1B:
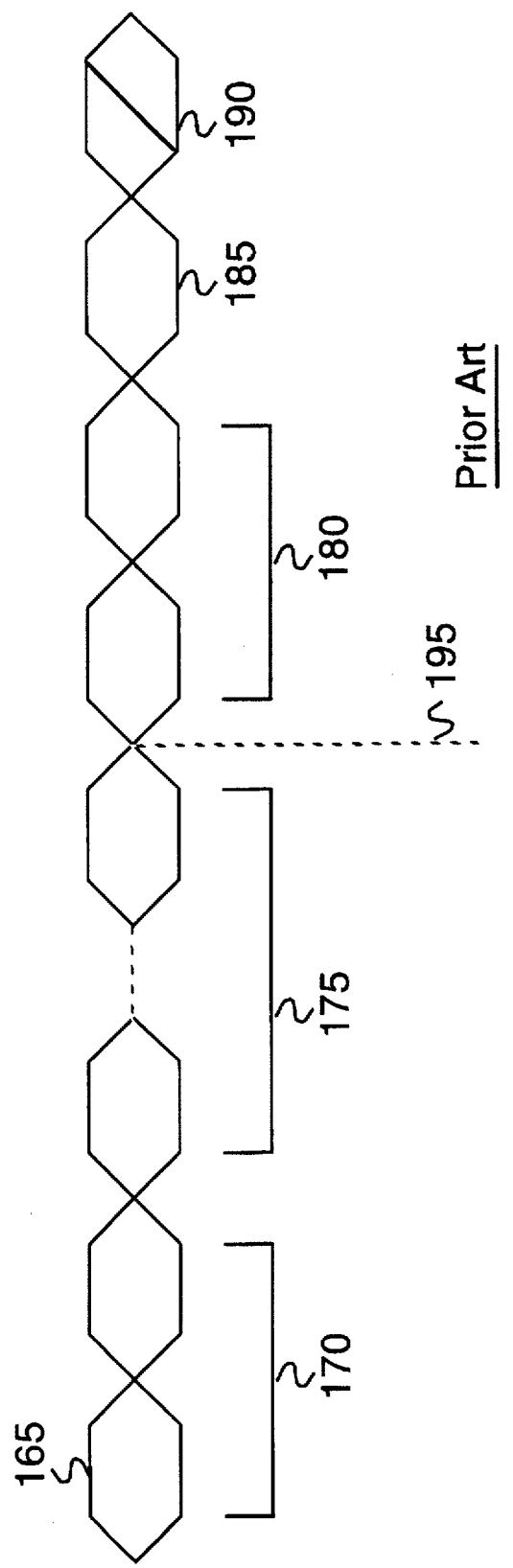
FIG. 1(b) shows a prior art pictorial diagram illustrating the byte sequence of a transmit signal used by the printer in communication with the network bus.
Figure 1C:
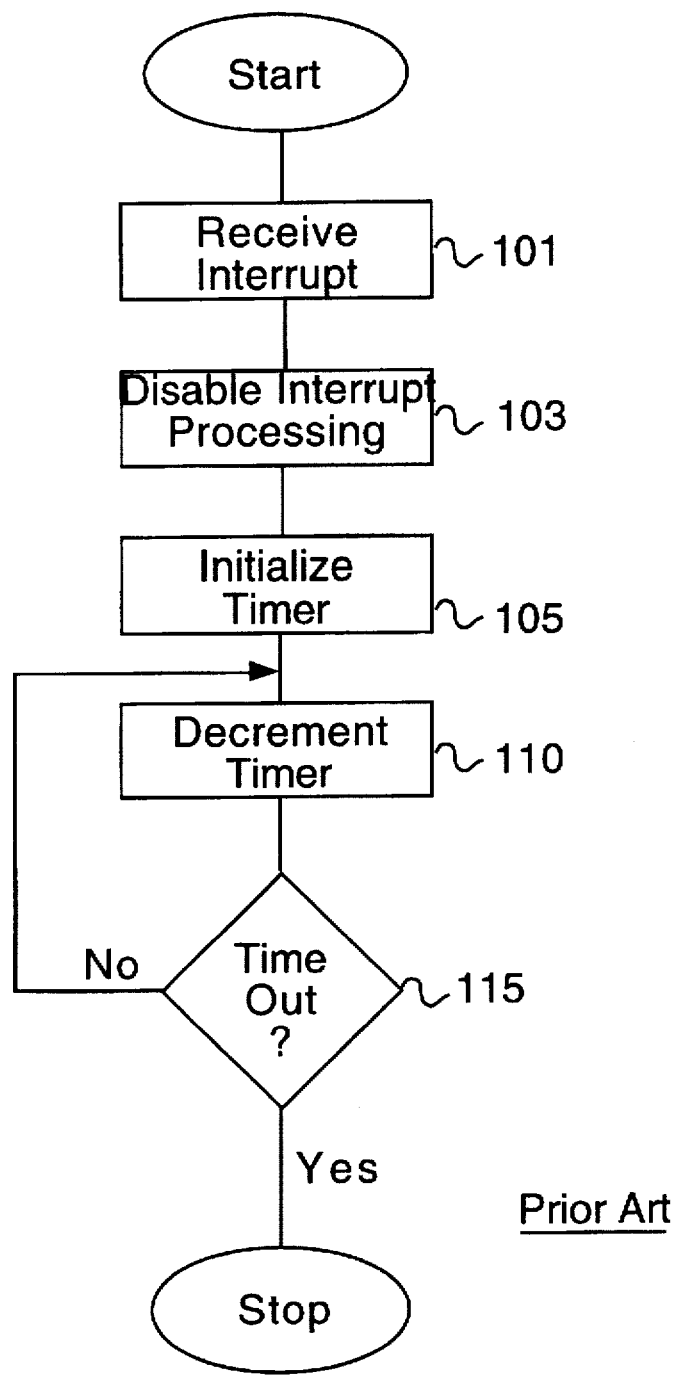
FIG. 1(c) illustrates a timing loop conventionally used in the prior art to introduce delay to an interrupt signal.

In the preferred embodiment, the system clock runs at 30 MHz; the LocalTalk protocol has a clock period of 34.72 microseconds per byte. The value which must be loaded into the value register 715 to achieve a delay of four-and-a-half bytes is equal to approximately 157 microseconds or approximately 4,687 CPU cycles. Therefore, the value of 4,687 is loaded into the value register 715 for the transmit operating mode of the SCC 340. In the same way, the receive mode of the SCC 340 uses a preferred value of 1563 cycles in the value register 715, representing 1.5 bytes of required delay (t'). Thus, an important advantage of the present invention is that the CPU 305 is not required to spend the 4,687 CPU cycles in a wait loop as described in FIG. 1 of the prior art. Instead, this interrupt delay is generated as a separate hardware function freeing the CPU 305 to process other data.

While the present invention has been described with reference to certain preferred embodiments, those skilled in the art will recognize that various modifications must be provided. For example, modifications might include, but would not be limited to the use of a decrement counter instead of an increment counter in 705. Indeed, the entire interrupt controller 335 could be implemented as a programmable state machine or a microcoded ALU function. These and other variations upon and modifications to the preferred embodiment are provided for by the present invention which is limited only by the following claims.

We claim:

1. A programmable interrupt delay comprising:

a memory containing at least one delay value;

a communication circuit which generates an interrupt output corresponding to the communication of a data stream;

a timing circuit having an input coupled to the communication circuit and having an output, and which begins generating and incrementing a timing value in response to the generation of said interrupt output; and a comparator coupled to the memory and to the output of the timing circuit for comparing one of the at least one delay values to the timing value and generating a delayed interrupt responsive to the comparison.

2. The programmable interrupt delay of claim 1, further comprising a programming circuit coupled to said memory for storing the at least one delay value to the memory.

3. The programmable interrupt delay of claim 1, wherein the timing circuit comprises a digital counter.

4. The programmable interrupt delay of claim 1, wherein a first delay value is contained in the memory if the communication circuit is transmitting data and a different second delay value is contained in the memory if the communication circuit is receiving data.

5. The programmable interrupt delay of claim 1, wherein the timing circuit comprises a state machine.

6. The programmable interrupt delay of claim 1, wherein the transmission of the communication data stream is to a network data bus.

7. The programmable interrupt delay of claim 6, wherein the network data bus operates using a LocalTalk protocol.

8. The programmable interrupt delay of claim 1, wherein the timing circuit increments the timing value negatively upon receipt of said interrupt output.

9. The programmable interrupt delay of claim 1, wherein the delayed interrupt is generated when the timing value and the delay value are equal.

10. A method for generating a programmable interrupt delay in a communication circuit comprising the steps of:
    storing at least one delay value equal to a specific interrupt delay period;
    generating an interrupt in response to the transmission of a data stream;
    initiating a timer responsive to said generated interrupt;
    comparing a timer value in the initiated timer with the stored at least one delay value; and
    generating a delayed interrupt responsive to the comparison of the timer value and the stored delay value.

11. The method according to claim 10, wherein the step of generating a delayed interrupt is performed when the timer value is equal to the received delay value.

12. The method according to claim 10, further comprising the step of incrementing the timer value in the initiated timer repeatedly until said timer value equals said stored delay value.

13. The method according to claim 10 wherein the step of storing includes storing a first delay value if the communication circuit is sending data, and includes storing a different second delay value in the memory if the communication circuit is receiving data.

14. A circuit for generating a programmable interrupt delay in a communication circuit comprising:
    means for storing at least one delay value equal to a specific interrupt delay period;
    means for generating an interrupt in response to the communication of a data stream;
    means for initiating and incrementing a value in a timer responsive to said generated interrupt;
    means for comparing a timer value in the initiated timer with the stored at least one delay value; and
    means for generating a delayed interrupt responsive to the comparison of the timer value and the stored delay value.

15. The circuit according to claim 14, wherein the delayed interrupt is generated when the timer value is equal to the received delay value.

16. The circuit according to claim 14, wherein said means for initiating and incrementing comprises means for incrementing the timer value in the initiated timer until said timer value equals said stored delay value.

17. The circuit according to claim 14 wherein a first delay value is stored if the communication circuit is sending data and a different second delay value is stored if the communication circuit is receiving data.

* * * * *